US006326739B1

(12) United States Patent
MacLennan et al.

(10) Patent No.: US 6,326,739 B1
(45) Date of Patent: *Dec. 4, 2001

(54) WEDDING RING SHAPED EXCITATION COIL

(75) Inventors: Donald A. MacLennan, Gaithersburg; Peter Tsai, Olney, both of MD (US)

(73) Assignee: Fusion Lighting, Inc., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/616,993

(22) Filed: Jul. 14, 2000

Related U.S. Application Data

(62) Division of application No. 09/228,230, filed on Jan. 11, 1999, now Pat. No. 6,137,237.
(60) Provisional application No. 60/071,192, filed on Jan. 13, 1998, provisional application No. 60/071,284, filed on Jan. 13, 1998, provisional application No. 60/071,285, filed on Jan. 13, 1998, provisional application No. 60/083,093, filed on Apr. 28, 1998, provisional application No. 60/091,920, filed on Jul. 7, 1998, provisional application No. 60/099,288, filed on Sep. 4, 1998, provisional application No. 60/102,968, filed on Oct. 2, 1998, and provisional application No. 60/109,591, filed on Nov. 23, 1998.

(51) Int. Cl.[7] .................................................. H05B 41/16

(52) U.S. Cl. ......................... 315/248; 315/39; 315/344; 313/231.41; 313/153; 313/634

(58) Field of Search ....................... 315/248, 39, 111.51, 315/344; 313/231.31, 231.41, 231.61, 231.71, 153, 154, 634

(56) References Cited

U.S. PATENT DOCUMENTS

| Re. 21,150 | 7/1939 | Lepel | 176/122 |
|---|---|---|---|
| Re. 32,527 | 10/1987 | Shinkawa et al. | 331/99 |
| 843,534 | 2/1907 | Hewitt . | |
| 1,854,912 | 4/1932 | Spaeth . | |

(List continued on next page.)

FOREIGN PATENT DOCUMENTS

| 38 42 756 | 6/1990 | (DE) . |
|---|---|---|
| 0309270 | 3/1989 | (EP) . |
| 0357453 | 3/1990 | (EP) . |

(List continued on next page.)

OTHER PUBLICATIONS

Godyak, V.A., et al., "Electrical and light characteristics of RF–inductive fluorescent lamps", *J. of the Illuminating Engineering Society*, p 40–44(Winter 1994), presented at the 1993 IESNA Annual Conference.

(List continued on next page.)

*Primary Examiner*—Haissa Philogene
(74) *Attorney, Agent, or Firm*—Paul E. Steiner

(57) ABSTRACT

A high frequency inductively coupled electrodeless lamp includes an excitation coil with an effective electrical length which is less than one half wavelength of a driving frequency applied thereto, preferably much less. The driving frequency may be greater than 100 MHz and is preferably as high as 915 MHz. Preferably, the excitation coil is configured as a non-helical, semi-cylindrical conductive surface having less than one turn, in the general shape of a wedding ring. At high frequencies, the current in the coil forms two loops which are spaced apart and parallel to each other. Configured appropriately, the coil approximates a Helmholtz configuration. The lamp preferably utilizes an bulb encased in a reflective ceramic cup with a pre-formed aperture defined therethrough. The ceramic cup may include structural features to aid in alignment and/or a flanged face to aid in thermal management. The lamp head is preferably an integrated lamp head comprising a metal matrix composite surrounding an insulating ceramic with the excitation integrally formed on the ceramic. A novel solid-state oscillator preferably provides RF power to the lamp. The oscillator is a single active element device capable of providing over 70 watts of power at over 70% efficiency.

11 Claims, 9 Drawing Sheets

U.S. PATENT DOCUMENTS

| | | | |
|---|---|---|---|
| 2,333,052 | 10/1943 | Smith | 176/122 |
| 3,860,854 | 1/1975 | Hollister | 315/248 |
| 3,943,404 | 3/1976 | McNeil et al. | 315/39 |
| 4,007,392 | 2/1977 | Velfells et al. | 313/154 |
| 4,010,400 | 3/1977 | Hollister | 315/248 |
| 4,016,507 | 4/1977 | Havens | 331/96 |
| 4,021,727 | 5/1977 | Fellows | 324/20 R |
| 4,070,603 | 1/1978 | Regan et al. | 315/248 |
| 4,127,797 | 11/1978 | Perper | 315/209 R |
| 4,206,387 | 6/1980 | Kramer et al. | 315/248 |
| 4,245,178 | 1/1981 | Justice | 315/248 |
| 4,380,744 | 4/1983 | Kantorowicz | 331/107 R |
| 4,427,920 | 1/1984 | Proud et al. | 315/248 |
| 4,484,156 | 11/1984 | Khanna et al. | 331/60 |
| 4,547,750 | 10/1985 | Torizuka et al. | 331/99 |
| 4,613,796 | 9/1986 | Bay | 315/219 |
| 4,705,987 | 11/1987 | Johnson | 313/634 |
| 4,736,454 | 4/1988 | Hirsch | 455/129 |
| 4,775,845 | 10/1988 | McCoy | 331/96 |
| 4,783,615 | 11/1988 | Dakin | 315/248 |
| 4,812,702 | 3/1989 | Anderson | 313/153 |
| 4,864,194 | 9/1989 | Kobayashi et al. | 315/248 |
| 4,894,590 | 1/1990 | Witting | 315/248 |
| 4,894,591 | 1/1990 | Witting | 315/248 |
| 4,906,946 | 3/1990 | Mekata et al. | 331/99 |
| 4,908,492 | 3/1990 | Okamoto et al. | 219/121.52 |
| 4,922,210 | 5/1990 | Flachenecker et al. | 331/167 |
| 4,926,791 | 5/1990 | Hirose et al. | 118/723 |
| 4,949,053 | 8/1990 | Havens | 331/96 |
| 4,982,168 | 1/1991 | Sigmon et al. | 331/107 SL |
| 5,039,903 | 8/1991 | Farrall | 313/160 |
| 5,042,139 * | 8/1991 | Farrall | 29/602.1 |
| 5,070,277 | 12/1991 | Lapatovich | 315/248 |
| 5,072,157 | 12/1991 | Greb et al. | 315/248 |
| 5,084,801 | 1/1992 | El-Hamamsy et al. | 315/248 |
| 5,107,229 | 4/1992 | Cheesman | 331/185 |
| 5,118,997 | 6/1992 | El-Hamamsy | 315/248 |
| 5,159,346 | 10/1992 | Bosch et al. | 342/175 |
| 5,214,357 | 5/1993 | Dakin et al. | 315/248 |
| 5,259,436 | 11/1993 | Yun et al. | 164/97 |
| 5,289,139 | 2/1994 | Fiedziuszko et al. | 331/56 |
| 5,339,047 | 8/1994 | Mizan et al. | 330/286 |
| 5,367,226 | 11/1994 | Ukegawa et al. | 315/248 |
| 5,378,965 * | 1/1995 | Dakin et al. | 315/248 |
| 5,387,850 | 2/1995 | Bray et al. | 315/248 |
| 5,397,966 | 3/1995 | Vrionis et al. | 315/248 |
| 5,404,076 | 4/1995 | Dolan et al. | 313/572 |
| 5,448,137 | 9/1995 | Bobel | 315/244 |
| 5,483,206 | 1/1996 | Lohninger | 331/107 SL |
| 5,498,928 | 3/1996 | Lapatovich et al. | 315/39 |
| 5,498,937 | 3/1996 | Körber et al. | 315/248 |
| 5,500,574 | 3/1996 | Popov et al. | 315/248 |
| 5,541,482 | 7/1996 | Siao | 315/248 |
| 5,570,502 | 11/1996 | Sawtell et al. | 29/527.6 |
| 5,587,629 | 12/1996 | Gornstein | 315/200 R |
| 5,616,421 | 4/1997 | Sawtell et al. | 428/614 |
| 5,621,266 | 4/1997 | Popov et al. | 313/46 |
| 5,637,961 | 6/1997 | Ishii et al. | 315/111.51 |
| 5,661,365 | 8/1997 | Turner | 313/637 |
| 5,682,080 | 10/1997 | Dolan et al. | 313/570 |
| 5,834,895 | 11/1998 | Dolan et al. | 315/248 |
| 5,834,904 | 11/1998 | Waymouth | 315/248 |
| 5,841,243 | 11/1998 | Hooper | 315/248 |
| 5,841,244 | 11/1998 | Hooper | 315/248 |
| 5,852,339 | 12/1998 | Hamilton et al. | 313/11 |
| 5,886,478 | 5/1999 | Smith et al. | 315/248 |
| 5,886,479 | 5/1999 | Kennedy et al. | 315/248 |
| 5,962,986 | 10/1999 | Morse | 315/248 |
| 5,990,632 | 11/1999 | Smith et al. | 315/248 |
| 6,017,221 | 1/2000 | Flamm | 437/225 |
| 6,137,237 * | 10/2000 | MacLennan et al. | 315/248 |

FOREIGN PATENT DOCUMENTS

| | | |
|---|---|---|
| 0457242 | 11/1991 | (EP) . |
| 0458546 | 11/1991 | (EP) . |
| 2170668 | 8/1986 | (GB) . |
| 8-148127 | 6/1996 | (JP) . |
| 93/21655 | 10/1993 | (WO) . |
| 97/45858 | 12/1997 | (WO) . |

OTHER PUBLICATIONS

Piejak, R.B. et al., "A simple analysis of an inductive RF discharge", *Plasma Sources Sci. Technol.* 1:179–186 (1992).

Thomson, J.J., "On the discharge of electricity through exhausted tubes without electrodes". *Phil. Mag.* S.5., vol. 32, No. 197, p. 321–464 (Oct. 1891), The London, Edinburgh, and Dublin Philosophical Magazine and Journal of Science.

Wharmby, D., "Review of electrodeless discharges for lighting", Thorn Lighting Limited Presentation (Sep. 5, 1989).

Wharmby, D., "Electrodeless discharges for lighting", GE Lighting Europe Presentation (1994).

Wharmby, D.O., Ph.D., "Electrodeless lamps for lighting: A review", *IEEE Proceedings–A*, vol. 140, No. 6 (Nov. 1993).

Hagen, Jon B., "Radio–Frequency Electronics: Circuits and Applications", pp. 115–123, Cambridge University Press (1996).

Kipling, Kent, et al., "Low Wattage, Solid State Electrodeless Lamp Having High Brightness", *Journal of Technical Disclosure*, (Oct. 1, 1998).

"Low Wattage Solid State Electrodeless Lamp Having High Brightness", *Research Disclosure*, pp. 1341–1344 (Oct 1998).

Martin, Jose L.J. and González, Francisco J.O., "Accurate Linear Oscillator Analysis and Design", *Microwave Journal*, pp. 22, 24, 26, 28, 30–32, 37 (entire article)(Jun. 1996).

Raab, Frederick, "Class–F Power Amplifiers With Maximally Flat Waveforms", *IEEE Transactions on Microwave Theory and Techniques*, vol. 45(11):2007–2012 (Nov. 1997).

PCT Application No. PCT/US99/00047.

* cited by examiner

WEDDING RING SHAPED EXCITATION COIL

CROSS REFERENCE TO RELATED APPLICATIONS

This application is a divisional of co-pending application Ser. No. 09/228,230 filed Jan. 11 1999, now U.S. Pat. No. 6,137,237, and claims priority to provisional application Nos. 60/071,192, 60/071,284, and 60/071,285, all filed Jan. 13, 1998, No. 60/083,093, filed Apr. 28, 1998, No. 60/091, 920, filed Jul. 7, 1998, No. 60/099,288, filed Sep. 4, 1998, No. 60/102,968, filed Oct. 2, 1998, and No. 60/109,591, filed Nov. 23, 1998, each of which is herein incorporated by reference in its entirety.

Certain inventions described herein were made with Government support under Contract Nos. DE-FG01-95EE23796 and/or DE-FC01-97EE23776 awarded by the Department of Energy. The Government has certain rights in those inventions.

BACKGROUND

1. Field of the Invention

The invention relates generally to discharge lamps. The presently claimed invention relates more specifically to novel excitation coils for inductively coupled electrodeless lamps.

2. Related Art

In general, the present invention relates to the type of lamps disclosed in U.S. Pat. Nos. 5,404,076 and 5,903,091, each of which is herein incorporated by reference in its entirety.

Electrodeless lamps are known in the art. Such lamps may be characterized according to the type of discharge they produce. Electrodeless discharges may be classified as either E discharges, microwave discharges, travelling wave discharges, or H discharges. The invention relates to those discharges preponderantly characterized as H discharges.

FIG. 1 is a schematic diagram of a conventional electrodeless lamp which produces an H discharge. Electrodeless lamps which produce an H discharge are also referred to as inductively coupled lamps. Inductively coupled lamps were described more than 100 years ago by J. J. Thomson in the article "On the discharge of Electricity through Exhausted Tubes without Electrodes," printed in the London, Edinburgh, and Dublin Philosophical Magazine and Journal of Science, Fifth Series, Vol. 32, No. 197, October 1891. More recently, D. O. Wharmby, PhD surveyed the state of the electrodeless lamp art in the article entitled "Electrodeless lamps for lighting: a review," IEEE PROCEEDINGS-A, Vol. 140, No. 6, November 1993, pages 465 to 473.

Certain aspects of the operation of inductively coupled lamps are well understood and have been characterized analytically, for example, in articles by R. B. Piejack, V. A. Godyak and B. M. Alexandrovich entitled "A simple analysis of an inductive RF discharge," Plasma Sources Sci. Technol. 1, 1992, pages 179–186, and "Electrical and Light Characteristics of RF-Inductive Fluorescent Lamps," Journal of the Illuminating Engineering Society, Winter 1994, pages 40–44.

Inductively coupled lamps having various bulb and coil configurations are described in U.S. Pat. No. 843,534, entitled "Method of Producing Electric Light." More recently, inductively coupled lamps having novel excitation coils are described in U.S. Pat. Nos. 4,812,702, 4,894,591, and 5,039,903 (hereinafter, "the '903 patent").

As shown in FIG. 1, one example for a conventional inductively coupled lamp includes a low frequency power source 31 providing power to a coil 32 which is wound around a gas-filled vessel 33. The alternating current around the coil 32 causes a changing magnetic field, which induces an electric field which drives a current in the plasma. In effect, the plasma can be analyzed as a single turn secondary to the coil 32. See Piejack et al., referenced above. An H discharge is characterized by a closed electrical field, which in many examples forms a visible donut-shaped plasma discharge.

Other geometries have been disclosed for inductively coupled lamps. For example, FIG. 1 of the Wharmby article set forth examples (a)–(e), including a high inductance coil wound on a ferrite toroid, internal (or optionally external) to the bulb. See Wharmby at p. 471.

As used herein, "low frequency" with respect to an inductively coupled lamp is defined as a frequency less than or equal to about 100 MHz. For example, a typical operating frequency for conventional inductively coupled lamps is 13.56 MHz. For example, the '903 patent discusses an operating frequency range of 1 to 30 MHz, with an exemplary operating frequency being 13.56 MHz. Most, if not all, of the developments relating to known inductively coupled lamps provide lamps operating at low frequency (i.e. less than or equal to about 100 MHz).

Referring again to FIG. 1, during the starting operation of an inductively coupled lamp, an E field ionizes the fill in the gas-filled vessel 33 and the discharge is initially characteristic of an E discharge. Once breakdown occurs, however, an abrupt and visible transition to the H discharge occurs. During operation of an inductively coupled lamp, both E and H discharge components are present, but the applied H discharge component provides greater (usually much greater) power to the plasma than the applied E discharge component.

As used herein, "high frequency" with respect to an electrodeless lamp is defined as a frequency substantially greater than about 100 MHz. The prior art describes electrodeless lamps operating at high frequency, including lamps exhibiting coil structures. However, none of the "high frequency" electrodeless lamps in the prior art are, in fact, inductively coupled lamps.

For example, U.S. Pat. No. 4,206,387 describes a "termination fixture" electrodeless lamp which includes a helical coil around the bulb. The "termination fixture" lamp is described as operating the range from 100 MHz to 300 GHz, and preferably at 915 MHz. As noted by Wharmby, "termination fixture" lamps have a size-wavelength relationship such that they produce a microwave discharge, not an inductively coupled discharge.

U.S. Pat. No. 4,908,492 (hereinafter "the '492 patent") describes a microwave plasma production apparatus which includes a helical coil component. The apparatus is described as operating at 1 GHz or higher, and preferably at 2.45 GHz. As disclosed, however, the coil need not be terminated and a large diameter, multi-turn coil is preferred to produce a large diameter plasma. In such a configuration, the dimension of the exciting structure is comparable to the wavelength of the microwave frequency power and the discharge appears to be a travelling wave discharge, a microwave discharge, or some combination thereof. In any event, the resulting structure apparently does not operate by inductive coupling.

U.S. Pat. No. 5,070,277 describes an electrodeless lamp which includes helical couplers. The lamp is described as operating in the range of 10 MHz to 300 GHz, with a preferred operating frequency of 915 MHz. The helical couplers transfer energy through an evanescent wave which produces an arc discharge in the lamp. The arc discharge is described as very straight and narrow, comparable to an incandescent filament. Hence, this lamp apparently does not operate by inductive coupling.

U.S. Pat. No. 5,072,157 describes an electrodeless lamp which includes a helical coil extending along a discharge tube. The operating range for the lamp is described as 1 MHz to 1 GHz. The discharge produced by the lamp is a travelling wave discharge. The effect of the helical coil is discussed as enhancing the light output and providing some RF screening.

Japanese publication No. 8-148127 describes a microwave discharge light source device which includes a resonator inside the microwave cavity which has the shape of a cylindrical ring with a gap. The resonator is described as a starting aid and microwave field concentrator.

A number of parameters characterize highly useful sources of light. These include spectrum, efficiency, brightness, economy, durability (working life), and others. For example, a highly efficient, low wattage light source with a long working life, particularly a light source with high brightness, represents a highly desirable combination of operating features. Electrodeless lamps have the potential to provide a much longer working life than electroded lamps. However, low wattage electrodeless lamps have found only limited commercial applications.

SUMMARY

Various aspects, features, advantages, and applications of electrodeless lamps utilizing the novel excitation coils of the present invention may be understood with reference to the parent '230 application.

According to one aspect of the invention, an excitation coil is configured as a non-helical, semi-cylindrical conductive surface having less than one turn, in the general shape of a wedding ring. At high frequencies, the current in the coil forms two loops which are spaced apart and parallel to each other. Configured appropriately, the coil approximates a Helmholtz configuration.

According to another aspect of the present invention, an excitation coil for an inductively coupled electrodeless lamp includes a substantially non-helical, semi-cylindrical conductive surface having less than one turn. Preferably, the conductive surface comprises a wedding ring shape. Preferably, the conductive surface has a relatively thin radial thickness and an axial height at least greater than the radial thickness. More preferably, the axial height is between about one-third and about two-thirds of a diameter of the conductive surface.

According to another aspect of the invention, an excitation coil for an inductively coupled electrodeless lamp includes a conductive surface having a wedding ring shaped excitation portion and first and second leads bent tangential to the excitation portion and parallel to each other, the conductive surface having a cross-sectional shape generally corresponding to the upper-case Greek letter omega (Ω).

According to another aspect of the invention, an excitation coil for an inductively coupled electrodeless lamp includes one or more conductive surfaces configured to provide at least two current loops, wherein the at least two current loops are spaced apart from and substantially parallel to and in phase with each other. Preferably, the one or more conductive surfaces are configured to provide two semi-circular current loops, the two semi-circular current loops being substantially parallel to and in phase with each other and having a substantially same axis and diameter, wherein the two current loops are spaced apart by a height which is about 40 to 60 percent of the diameter of the two semi-circular current loops. The one or more conductive surfaces may include, for example, a single non-helical, semi-cylindrical surface having less than one turn. Alternatively, the one or more conductive surfaces comprise two non-helical, semi-cylindrical surfaces, each having less than one turn. The two non-helical, semi-cylindrical surfaces may be, for example, connected in parallel.

According to another aspect of the invention, an excitation structure for an inductively coupled electrodeless lamp includes two excitation coils connected in parallel, spaced apart from and substantially parallel to each other. Preferably, the two excitation coils are spaced apart from each other by a distance which approximates a Helmholtz configuration.

According to another aspect of the invention, an inductively coupled lamp utilizing the excitation coil has a driving frequency greater than 100 MHz. In some examples, the driving frequency is greater than about 300 or 500 MHz. In other examples, the driving frequency is greater than about 700 or 900 MHz. Preferably, the effective electrical length of the excitation coil is less than one half wavelength of the driving frequency. More preferably, the effective electrical length of the excitation coil is less than one quarter wavelength and may be less than one eighth wavelength. The high frequency power source may be, for example, a solid state high frequency power source.

The foregoing aspects of the invention are achieved individually and in combination. The invention should not be construed as requiring two or more of the foregoing aspects unless expressly required by the claims.

BRIEF DESCRIPTION OF THE DRAWINGS

The invention will be better understood with reference to the accompanying figures, wherein.

DESCRIPTION

Embodiments of the present invention can be utilized to provide a highly efficient, low power light source with a long working life, particularly a light source with high brightness, which represents a highly desirable combination of operating features. Low power, as used herein with respect to a light source, is defined as less than about 400 watts (W). The present invention provides electrodeless lamps that have the potential to provide a much longer working life than electroded lamps.

One aspect of the present invention is efficient high frequency operation. Although high frequency power sources and inductively coupled lamps are known, the prior art does not appear to teach the combination of a high frequency power source with a lamp configured for inductive coupling. The present invention resolves both practical barriers and technological barriers that have heretofore prevented such useful combinations.

In a capacitively coupled lamp system (i.e. an E discharge lamp) the impedance of the coupling circuit is inversely proportional to frequency. Thus, at high frequencies the impedance decreases and the lamp may be run at higher current and thus more efficiently. Hence, reduced impedance and higher efficiency offers a motivation for those skilled in the art to develop higher frequency capacitively coupled lamps.

In an inductively coupled lamp system (i.e. an H discharge lamp), the impedance of the circuit would be expected to vary in direct proportion to frequency. Thus, at sufficiently high frequencies, the impedance would so increase such that an inductively coupled lamp would not operate with any reasonable efficiency, if at all.

Figure 1:
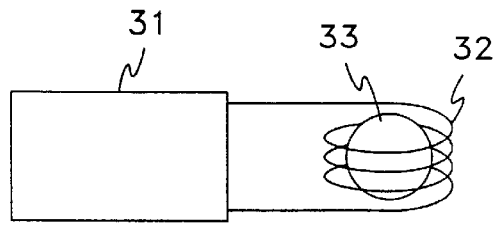
FIG. 1 is a schematic diagram of a conventional electrodeless lamp which produces an H discharge.
Figure 2:
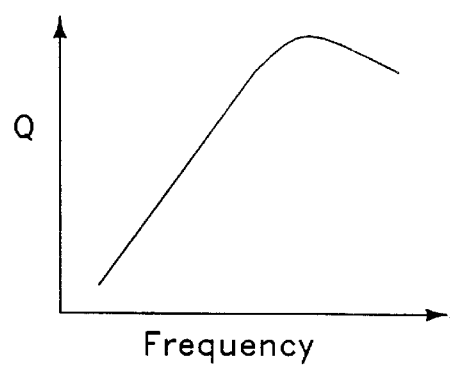
FIG. 2 is a graph of Q versus frequency.

By way of illustration, the quality factor Q of a coil is an indication of the coil's operating efficiency, i.e. efficiency in transferring energy to a device (e.g. a secondary coil coupled thereto). Q may be represented by the equation:

$$Q = \frac{\omega L}{R} \quad \text{Equation (1)}$$

where L is the inductance of the coil, R is the resistance of the coil, and ω is the radian or angular frequency (ω=2π×f, where f is the operating frequency). FIG. 2 shows a typical plot of Q versus frequency for a given coil. As can be seen from the plot, Q increases proportional to the square root of frequency up to a point, beyond which Q declines. One reason that Q declines or "rolls off" from its peak value is that, at higher frequencies, "parasitics" or untoward factors are present which affect the coil performance by increasing the coil losses (i.e. the impedance of the coil). At these higher frequencies, the coil losses increase proportionately greater with increasing frequency, thereby causing Q to roll off.

For example, the "proximity effect" is a known phenomenon which describes how, as the coil turns get closer together, the Q rolls over sooner due to inter-turn capacitance. Other factors, such as skin depth and eddy current effects, may also contribute to increasing the effective resistance of the coil at higher frequencies. Increasing the effective resistance (i.e. R in equation 1) of the circuit may cause the roll off to accelerate. Thus, at higher frequencies, the proximity effect (inter-turn capacitance) and other parasitic effects which degrade coil performance become significant obstacles to efficient coil operation.

A further technological barrier to operating an inductively coupled lamp at high frequencies is that parasitic effects, such as those which affect coil performance, are also present in the coupling circuit, i.e. the circuitry operatively linking the power source to the lamp. Such effects would be expected to complicate the circuit design of the coupling circuit. For example, at high frequencies even straight wires take on inductive characteristics; a mutual inductance may occur between one straight wire and another straight wire.

Further, stray capacitances of certain parts of the coil to other parts of the coupling circuit are also present.

Thus, in light of both practical and technological barriers, persons skilled in the art apparently have not heretofore configured electrodeless lamps as inductively coupled lamps connected to a power source operating at high frequency. For example, considerations relating to the coil Q factor and high frequency coupling circuits suggest that a very high frequency (e.g. above about 1 GHz) inductively coupled lamp would be very inefficient, if operable at all.

The devices in accordance with the present invention overcome one or more of the problems presented in the prior art through the design of the lamp and circuit elements, i.e. through the size of the exciting structure and the physical size of the circuit elements. Because physically large circuit elements are more susceptible to the above discussed parasitics, the device of the present invention overcomes this deficiency by making the circuit elements sufficiently small (e.g., as small as practically possible) to permit efficient operation.

Preferably, an effective electrical length of the coil is less than about a half wavelength of a driving frequency applied thereto. More preferably, the effective electrical length of the coil is less than about a quarter wavelength. Most preferably, the effective electrical length of the coil is less than about one eighth wavelength. The driving frequency is preferably greater than 100 Mhz and may be greater than about 300 MHz, 500 Mhz, 700 Mhz, or 900 MHz.

Figure 3:
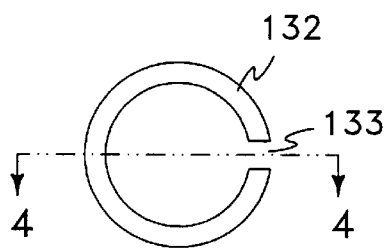
FIG. 3 is a schematic view of a novel excitation coil according to the invention.
Figure 4:
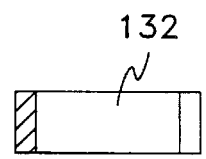
FIG. 4 is a sectional view of the novel excitation coil according to the invention, taken along line 4—4 in FIG. 3.
Figure 5:
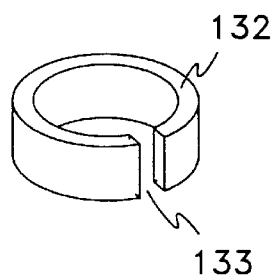
FIG. 5 is a perspective view of the novel excitation coil according to the invention.

FIGS. 3–5 show a schematic view, a sectional view, and a perspective view, respectively, of a novel excitation coil according to the invention. According to the invention, a coil 132 has a generally "wedding ring" shaped structure with a slot 133. Several wedding ring shaped coils having the following dimensions (in mm) are constructed as follows:

TABLE 3

| INNER DIAMETER | RADIAL THICKNESS | AXIAL HEIGHT |
| --- | --- | --- |
| 9.5 | 1.3 | 1.9 |
| 9.5 | 1.3 | 2.5 |
| 9.5 | 1.3 | 3.2 |
| 9.5 | 0.6 | 1.3 |
| 9.5 | 0.6 | 1.8 |
| 9.5 | 0.6 | 2.3 |
| 9.5 | 0.6 | 2.8 |
| 9.5 | 0.6 | 3.3 |
| 9.5 | 0.6 | 3.8 |
| 9.5 | 0.6 | 4.3 |
| 9.5 | 0.6 | 5.1 |
| 9.5 | 0.6 | 6.4 |

In each of the foregoing examples, the slot width is between about 1.8 and 3.5 mm.

As used herein, a "wedding ring" shaped coil refers generally to a radially relatively thin and axially relatively tall conductive surface, preferably less than one turn, and preferably evidencing a non-helical configuration. In other words a wedding ring shaped coil has a small radial thickness (i.e. difference between outer diameter and inner diameter) and an axial height at least greater than the radial thickness.

For the purpose of comparison, inductively coupled lamps were constructed having a relatively thick washer shaped coil (e.g. similar to the coil disclosed in the '903 patent). For example, the washer shaped coil had an inner diameter of 9.5 mm, an outer diameter of 19.7 mm, a thickness of 3.3 mm and a slot width of 3.5 mm. As noted in the '903 patent, the washer shaped coils block less light and appear to provide good heat handling characteristics.

However, the wedding ring shaped coils of the present invention exhibited significantly more efficient operation than either helical coils or the washer shaped coils when coupled to essentially the same coupling structure.

Figure 6:
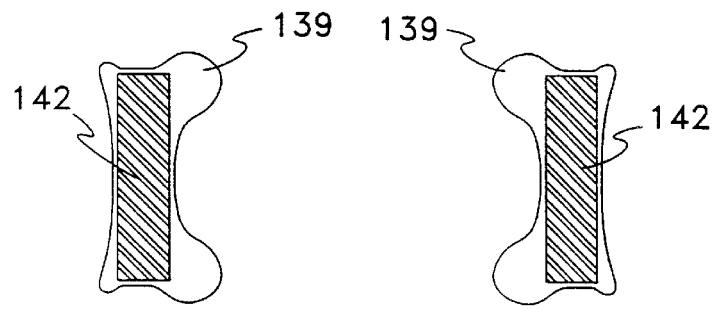
FIG. 6 is a graphical illustration of current distribution in the excitation coil shown in FIGS. 3–5.

FIG. 6 is a graphical illustration of current distribution in the excitation coil shown in FIGS. 3–5, of a well coupled operating lamp at high frequencies. In FIG. 6, the distance the line 139 is spaced from the coil 142 surface represents the amount of current flowing in that area of the coil 142. The current is distributed towards the outside edges of the coil 142. As can be seen from FIG. 6, relatively little current flows in the middle section of the coil 142. Thus, the current flowing in the coil 142 essentially forms two loops of current at opposite outside edges of the coil 142.

During operation, the lamp operates more efficiently with two current loops. One half of the current flows in two rings causing only one fourth the loss in each loop. The total loss in the sum of the loss in each loop, resulting in one half of the overall losses for an operating lamp. Therefore, efficiency is greatly improved.

Generally, more current is distributed on the side facing the bulb (if the coil is closely coupled to the bulb). Effectively, the coil current and the plasma current are drawn together to achieve energy minimization. The closer the coupling between the two currents, the greater the forces driving the two currents to be as close to each other as possible.

At high frequencies, substantially all of the current is carried in the skin depth of the coil material. As is well known in the art, the skin depth depends on the material and the operating frequency. For example, the skin depth of copper (in inches) at room temperature is about 2.61 divided by the square root of the frequency. Thus, at about 1 GHz, the skin depth of copper is about 0.0001 inches (1/10th mil). Preferably, the radial thickness of a wedding ring shaped coil according to the invention is at least several skin depths, and more preferably, the radial thickness should be greater than about 10 skin depths.

Preferable examples have a radial thickness less than about 0.8 mm (0.03 inches). For example, devices with an axial height of between about 4.0 and 5.0 mm (0.15 to 0.2 inch) are constructed with a radial thicknesses of between about 0.18 and 0.54 mm (0.007 to 0.021 inch) and maintain comparable efficiency within that range of radial thicknesses. For very thin coils, the coil material is alternatively deposited directly on an insulating surface.

The preferred axial height for the wedding ring shaped coil according to the invention is at least greater than the radial thickness and up to about $2/3$ of the inside diameter of the coil, with between $1/3$ and $2/3$ of the inside diameter of the coil providing better efficiency.

For example, when the axial height of the coil is about equal to the inside radius of the coil, the operation of the wedding ring shaped coil approximates a Helmholtz coil configuration, i.e. a pair of flat, circular coils having equal numbers of turns and equal diameters, arranged with a common axis and connected in series. The optimum arrangement for Helmholtz coils is when the spacing between the two coils is equal to the radius. Helmholtz coils are known to produce a uniform magnetic field, with the midpoint between the two coils, along the common axis, being the point of nearly uniform field strength. In an inductively coupled lamp, uniformity of field is not generally thought of as a critical operating parameter. However, the volume integral of the power density in a wedding ring/Helmholtz coil configuration is also at an optimum, thereby providing optimum inductive coupling to the volume between the coils.

Thus, with the appropriate axial height, an operating lamp utilizing the wedding ring shaped coil according to the invention provides two current loops spaced apart by a distance equal to the inside radius of the coil. Each current loop corresponds approximately to one coil of the Helmholtz coil configuration. A precise Helmholtz arrangement, however, is not required for acceptable efficiency. As the coil height approaches the Helmholtz arrangement, the losses become less, but decreasing asymptotically. Thus, the axial height of the coil may be somewhat greater or smaller than the inside radius of the coil with only a small effect on efficiency. Accordingly, the wedding ring/Helmholtz configuration provides a robust system which allows a wide range of design for other lamp parameters.

FIGS. 7–22 are perspective views and schematic views, respectively, of different examples of the novel excitation coil according to the invention. FIGS. 3–5 show a preferred wedding ring shaped coil with an axial height about equal to the inside radius.

As illustrated in FIG. 6, little current flows in the middle section of the wedding ring shaped coil. Accordingly, the middle section may be removed with little effect on coil efficiency. A "split wedding ring" shaped coil refers to a generally wedding ring shaped coil with at least a portion of the middle section of the wedding ring removed. When split wedding ring shaped coils having two or more parallel rings are compared for efficiency with the wedding ring shaped coil, no significant differences in efficiency are noted.

Figure 7:
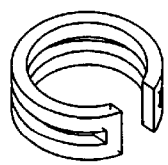
FIGS. 7–8 are perspective and schematic views, respectively, of a preferred structure of a split wedding ring shaped coil according to the invention.
Figure 9:
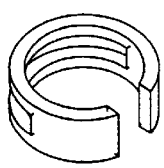
FIGS. 9–10 are perspective and schematic views, respectively, of a first alternative split coil structure.
Figure 8:
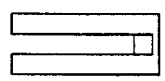
Figure 10:

FIGS. 7–8 show a preferred structure of a split wedding ring shaped coil with all but a small portion of the middle one-third of the wedding ring shaped coil removed. FIGS. 9–10 show an alternative structure with the middle one-third of the wedding removed from about one half of the wedding ring shaped coil.

Figure 11:
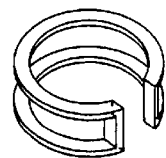
FIGS. 11–12 are perspective and schematic views, respectively, of a second alternative split coil structure.
Figure 12:
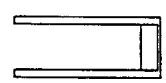

FIGS. 11–12 show an alternative structure, where only a thin sliver of each split ring remains. More preferably, the split rings are made relatively thicker in order to reduce the current density in the coil material, thereby reducing power losses (e.g., heating the coil to a lesser extent) and making the lamp more efficient.

Figure 13:
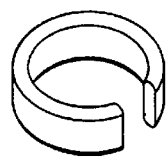
FIGS. 13–14 are perspective and schematic views, respectively, of a coil with rounded edges.
Figure 14:
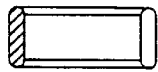
Figure 17:
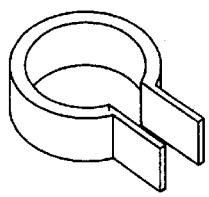
FIGS. 17–18 are perspective and schematics views, respectively, of a wedding ring shaped coil with integral leads.
Figure 19:
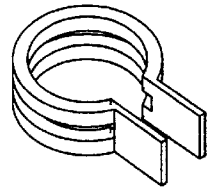
FIGS. 19–20 are perspective and schematics views, respectively, of a split coil with integral leads.

FIGS. 13–14 illustrate that a rectangular cross section is not required and the edges may be rounded. Other shapes for the edges are also possible. Preferably, the coil cross section shape allows the current to spread out. In general, the more the current spreads out the greater the efficiency because localized power losses are reduced. Making the radial thickness of the coil too thin (although minimizing eddy current losses) increases current density and the corresponding power losses.

Figure 15:
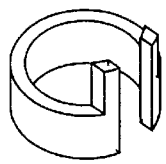
FIG. 15 is a perspective view of a further example of the novel excitation coil according to the invention.
Figure 16:
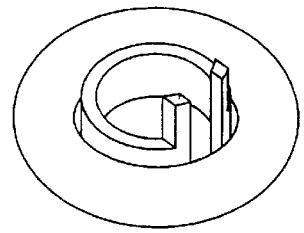
FIG. 16 shows a perspective view of the coil from FIG. 15 positioned inside a torus shaped bulb.

FIGS. 15–16 are perspective views, respectively, of a further example of the novel excitation coil according to the invention. In this example, leads to the coil do not extend beyond the outside diameter of the coil, so that the coil may be positioned inside a torus shaped bulb. FIG. 16 shows a perspective view of a torus shaped bulb. In the case of FIG. 16, the coil 42 could be positioned either inside the bulb or outside the bulb, depending on the application.

Figure 21:
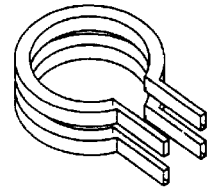
FIGS. 21–22 are perspective and schematics views, respectively, of another split coil with integral leads.
Figure 18:
Figure 20:
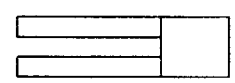
Figure 22:
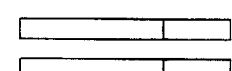

FIGS. 17–22 show examples of wedding ring and split wedding ring coils with integral leads for connecting to the rest of the lamp circuit. Note that, as shown in FIGS. 21–22, the top and bottom coil sections need not be physically connected as long the currents passing through the two sections are close in phase and about equal in magnitude.

Figure 23:
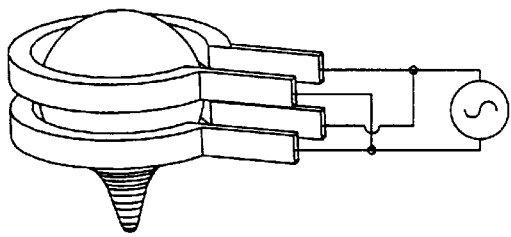
FIG. 23 is a partially schematic diagram showing a lamp utilizing a split coil arrangement with a single power source driving both rings.
Figure 24:
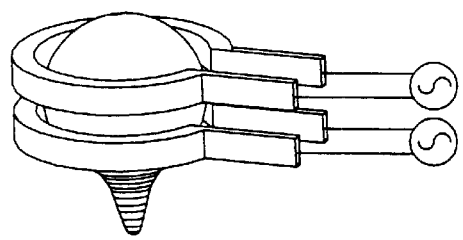
FIG. 24 is a partially schematic diagram showing a lamp utilizing a split coil arrangement with two power sources driving the two rings separately.
Figure 25:
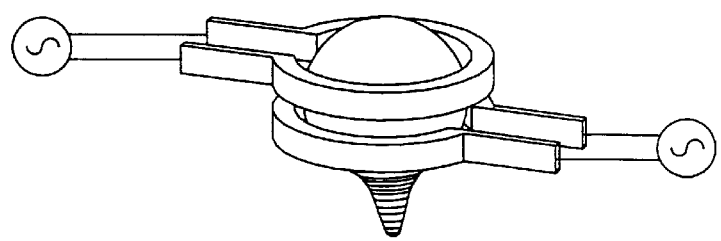
FIG. 25 is a partially schematic diagram showing a lamp utilizing another split coil arrangement with two power sources.
Figure 26:
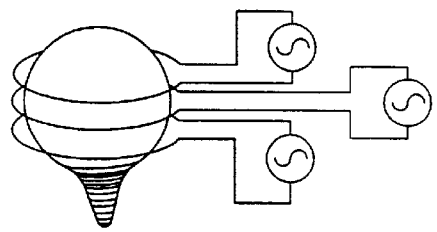
FIG. 26 is a partially schematic diagram showing a lamp utilizing a split coil arrangement with three power sources separately powering three rings.

FIGS. 23–26 are schematic diagrams showing lamps utilizing different split wedding shaped coil arrangements according to the invention. In each of FIGS. 23–26, the circuits are configured so that the current in each of the split rings is close in phase and about equal in magnitude. In FIG. 23, a single power source drives both rings. In FIG. 24, two power sources drive the two rings separately. In FIG. 25, two power sources separately power the two rings, and the leads of the two rings are positioned at opposite directions. In FIG. 26, three power sources separately power three rings, with one ring being centrally positioned, and the other two rings being symmetrically spaced about the center.

While the novel "wedding ring" shaped excitation coil has been described above with reference to specific shapes and structures, these examples should be considered as illustrative and not limiting. For example, by way of illustration and not limitation, elliptical, square, rectangular, kidney, and arbitrary cross-sectional shaped coils may alternatively be employed in place of the circular cross sections exemplified above. Also, while the novel "wedding ring" shaped excitation coil has been described in the parent specification as being coupled to various excitation structures, the novel excitation coil according to the invention may be utilized with other circuit designs. For example, depending on the operating frequency, a suitable lamp may be built from discrete components (e.g. off the shelf capacitors). Moreover, while the novel "wedding ring" coil has been described with respect to high efficiency lamps operating at high frequencies and/or very high frequencies (e.g. above about 900 MHz), the utility of this configuration is not limited to such high or very high frequency applications. For example, the novel excitation coil according to the invention is suitable for a lamp operating at about 13.56 MHz, 2 MHz, 1 MHz, or lower frequencies, providing advantages as set forth above at these lower operating frequencies.

Figure 27:
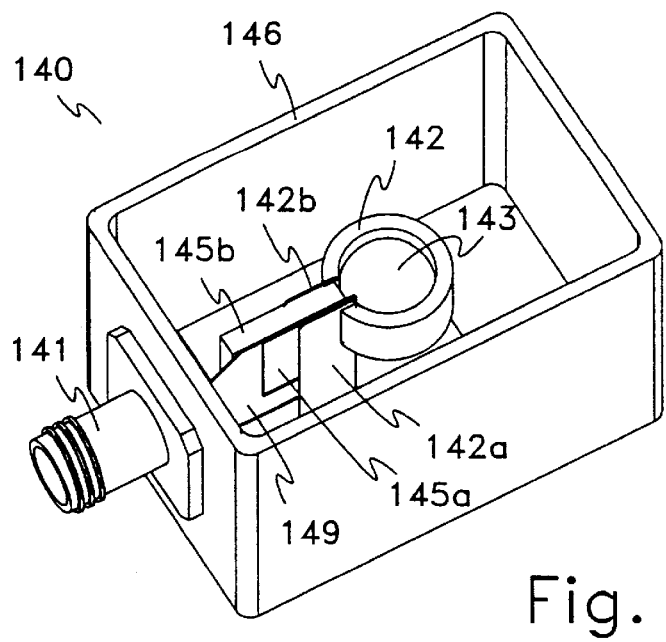
FIG. 27 is a perspective view of a first example of an electrodeless lamp utilizing an excitation coil according to the present invention.

FIG. 27 is a perspective view of an example of an electrodeless lamp according to the invention, utilizing an example of the wedding ring shaped excitation coil shown in FIGS. 3–5. Reference may be had to the parent specification for the construction and operation of this example lamp.

Figure 28:
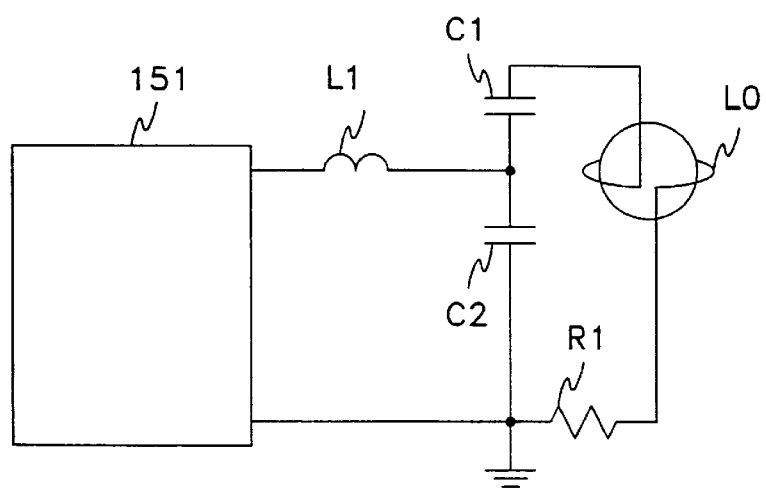
FIG. 28 is a schematic diagram of the first example.

FIG. 28 is a schematic diagram of the first example. The series resonant circuit includes two capacitors C1 and C2 connected in series with each other and connected in series with a series resonant coil L0. A power source 151 provides a high frequency signal through a small inductance L1 to the junction of C1 and C2. The other side of C2 is grounded. The series resonant coil L0 is also connected to ground through a small resistance R1, which represents the lumped circuit resistance.

During operation, the circuit operates as a series resonant circuit, in which L0 is the series resonant inductor and both C1 and C2 operating together are the series resonant capacitor. In other words, the two capacitors C1 and C2 tied together in series effectively provides one series resonance capacitance C0. The capacitor C0 and the inductor L0 together form the series resonant circuit, which during operation has a ringing current. Power is supplied to the series resonant circuit in the form of a high frequency alternating current. As the power continues to be supplied, the energy moves between the capacitors, C1 and C2, and the coil L0 in an alternating manner. There are inevitable losses in the circuit, represented by R1 in FIG. 28. The energy (power) supplied to the series resonant circuit replenishes the losses, and the series resonant circuit continues to ring.

The lamp is considered to operate at the applied input power frequency. In other words, the system operates at the power source frequency, assuming that the power source frequency is sufficiently close to the actual series resonant circuit frequency. During operation, the bulb plasma reflects a certain amount of resistance back into the circuit and there is some natural resistance (represented collectively by R1). The actual resonant frequency of the series resonant circuit need not exactly match the power source frequency. The resonant frequency is preferably about the same as the power source frequency, taking into account the Q of the circuit with the circuit loaded (i.e. with an operating bulb). Depending on the Q of the circuit, the range of effective operating frequencies may be relatively wide. In other words, the circuit may operate off actual resonance and still operate efficiently (i.e. fairly well matched and fairly well working).

Referring back to FIG. 27, during operation of the present example of the invention, high frequency power is brought in through the connector 141 and is supplied through the blade 149 to the series resonant circuit. The blade 149 is a relatively low current carrying element, compared to the rest of the circuit, and has a small inductance (i.e. included in L1 along with the connector lead). The blade 149 feeds energy into the series resonant circuit as the energy is dissipated through the coil 142 (i.e. L0) and other lossy elements in the circuit. For example, some energy is lost in operation, mostly by resistance (i.e. R1). A small amount of energy may also be lost by radiation. The ringing current passes around the coil 142 and through the first capacitor (formed by the plate 142a, dielectric 145a, and the end portion of the blade 149) and the second capacitor (formed by the end portion of the blade 149, the dielectric 145b and the plate 142b). Preferably, the first capacitor (i.e. C1) provides a high voltage and a low capacitance and the second capacitor (i.e. C2) provides a low voltage and high capacitance.

Thus, in the present example, the series resonant circuit is confined in space to just around the coil 142 and through the two capacitors. Preferably, the two capacitors are formed between the slot of the coil 142 to keep the circuit elements as small as possible. The two capacitors perform a dual function of (1) tuning the resonant frequency and (2) providing impedance matching for the input power source.

The specific dimensions (i.e. how much of a turn the coil makes, the spacing between the blade and the electrode on one side, and the spacing between the blade and the electrode on the other side) are determined as a function of the dielectric material (i.e. its dielectric constant), the operating frequency, and the resonant frequency of the circuit (which depends on the inductance of the coil). The capacitance depends on the area of the electrode size as well as the dielectric material and its thickness. For a particular lamp configuration, the choices for the capacitor materials and sizes may be readily determined by one of skill in the art. The material of choice is preferably a low-loss tangent material of reasonable dielectric constant. Preferred dielectric materials include, for example, alumina and quartz. Other details regarding the construction and operation of this example may be had by reference to the parent specification.

Figure 29:
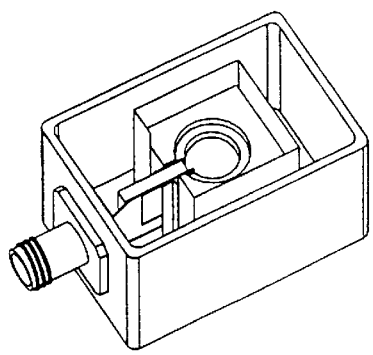
FIG. 29 is a perspective view of a second example of an electrodeless lamp utilizing an excitation coil according to the invention.

FIG. 29 is a perspective view of another example of an electrodeless lamp which utilizes a blade structure, the wedding ring (or split wedding ring) shaped excitation coil, a heatsink, and a stove pipe. Reference may be had to the parent specification for the construction and operation of this example lamp.

Figure 30:
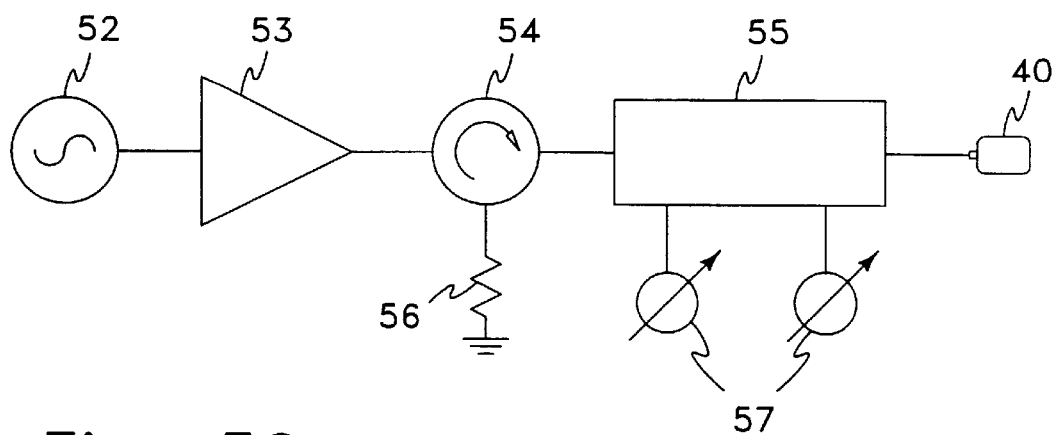
FIG. 30 is a schematic diagram of a system for operating and evaluating the lamps described herein.

FIG. 30 is a schematic diagram of a system for operating and evaluating the lamps described herein. A high frequency signal source 52 is connected to an amplifier 53. The output of the amplifier 53 is connected to a circulator 54, which is connected through a directional coupler 55 to the lamp 40. The circulator 54 shunts reflected power to a load 56. The directional coupler 55 provides a plurality of taps which may be connected to measurement devices 57.

The above described evaluation system is operated, for example, at 915 MHz with 30–100 watts of power supplied by an amplifier made by Communication Power Corporation, Brentwood, N.Y., Model No. 5M-915-1,5E2 OPT 001, connected by a coaxial cable to a Hewlett-Packard Network Analyzer Model No. 8505A. The circulator and directional coupler employ commercially available components. The output of the directional coupler is connected to the input connector 41 via a coaxial cable.

Alternatively, the lamps described herein may be powered by any suitable power source capable of providing a suitable level of power at high frequency. For example, a magnetron may be used as the power source. Preferably, the microwave power from the magnetron would be coupled through an impedance matching device into a coaxial cable for supplying the power to the device. In another example, the lamps described herein are powered by a solid state oscillator such as the single active element power oscillators described in the parent specification.

In some applications, the heatsink need not be co-extensive with the coil for the entire circumference of the coil. To reduce phase slip and keep the electrical length of the coil as small as possible, a preferred heatsink arrangement includes a single slab of dielectric material positioned opposite to the coil power feed. Thermal sinking of the coil is further enhanced by the use of substantial input and/or output contacts, preferably made of metal such as, for example, copper.

Figure 31:
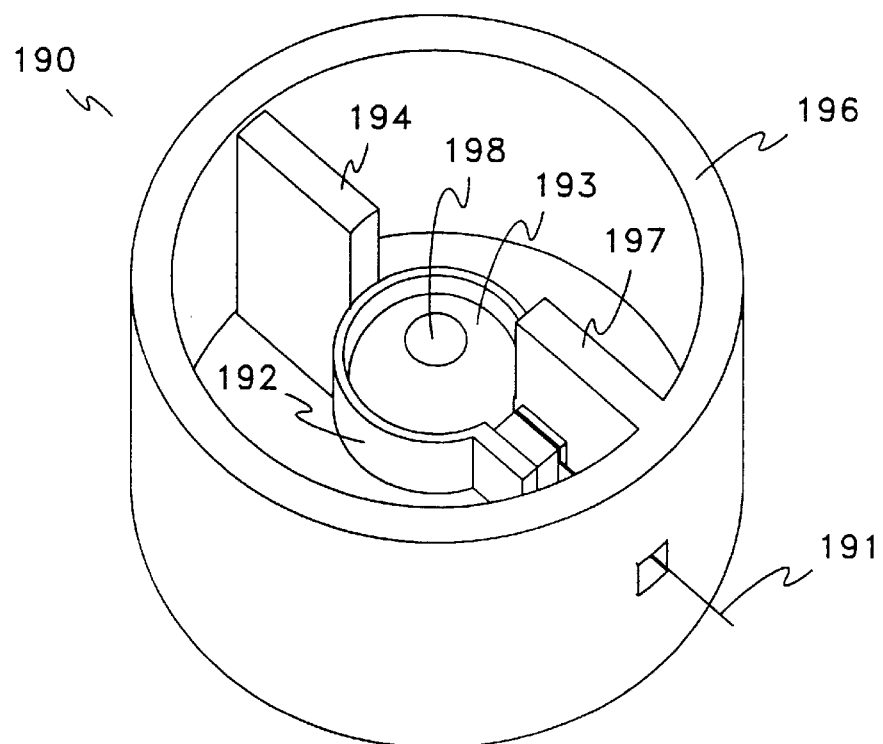
FIG. 31 is a perspective view of an third example of an electrodeless lamp utilizing an excitation coil according to the invention.

FIG. 31 is a perspective view of another example of an electrodeless lamp according to the invention. With reference to FIG. 31, an inductively coupled electrodeless lamp 190 includes an enclosure 196 housing a wedding ring shaped coil 192. A bulb 193 is disposed in the center of the coil 192 and supported by a dielectric 195. Power is brought into the lamp 190 by a thin wire lead 191 which is connected to a blade 199. Alternatively, a coaxial connector may be affixed to the housing 196 with power being brought in on the center conductor. A single dielectric 194 is in intimate thermal contact with a portion of the coil 192, at a position opposite to where the power is brought in through lead 191. The lead 191 is connected to a blade 199 inside the housing 196. The blade 199 extends between dielectrics 199a and 199b, thereby forming the capacitors of the series resonant circuit as described in detail above.

To improve thermal conductivity of the coil 192, the radial thickness of the coil is made as thick as possible without significantly reducing efficiency. For example, for a coil having a 5 mm inside radius and a 4 to 6 mm axial height, the coil's radial thickness should be about 0.25 mm to 0.75 mm. To improve thermal sinking of the coil 192, the ground contact is substantial and is connected to the front, top, and bottom of the enclosure. Thermal conduction of the lamp 190 is also improved by minimizing the coil 192 to enclosure 196 spacing, consistent with efficient operation as described above with respect to the stove pipe. For example, for a coil with a 5 mm inside radius, the enclosure 196 should be a right cylinder with the coil at its center. The enclosure 196 should have an outer diameter of about 20–30 mm and a height of about 20 mm.

Preferably, the dielectrics 194 and 195 are thermally conductive ceramics such as, for example, BeO, BN, or AlN. If phase distortion is to be minimized, BN is a preferred material. The bulb size and the coil diameter may be reduced to shorten the electrical length of the coil. Also, the operating frequency may be lowered to reduce the effects of phase slip.

In the present example, the bulb 193 is encased by a reflective jacket 198, examples of which are described below and PCT Publication WO 97/45858. The reflective jacket 198 forms an aperture for emitting light therefrom. This aperture lamp configuration provides a high brightness light source. The lamp 190 may be used with or without a light guide in registry with the aperture.

Figure 32:
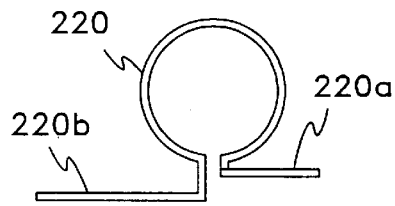
FIG. 32 is a schematic view of an alternative structure for the novel excitation coil according to the invention which is utilized in a fourth example of an electrodeless lamp utilizing an excitation coil according to the invention.
Figure 33:
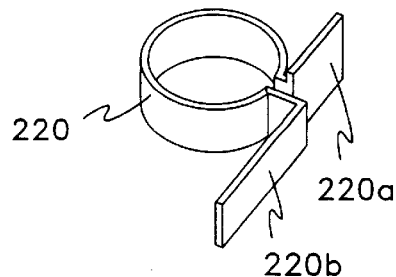
FIG. 33 is a perspective view of the alternative coil structure.

With reference to FIGS. 32–35, a novel excitation coil 220 has a cross-sectional shape generally corresponding to the upper-case Greek letter omega (Ω). The "omega" coil 220 has a generally wedding ring shaped excitation portion, but the leads 220a and 220b are bent tangential to the excitation portion and parallel to each other. As can be seen in FIG. 32, the omega coil 220 may include leads 220a and 220b that are not symmetrical with each other.

Figure 34:
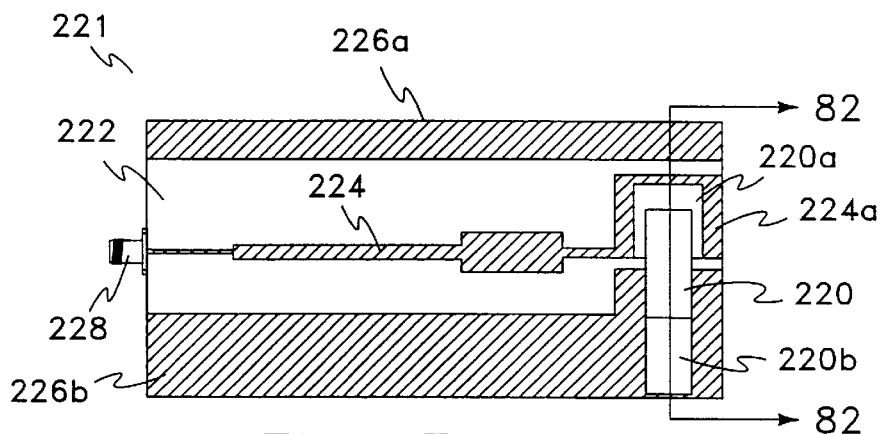
FIG. 34 is a top, schematic view of the fourth example.
Figure 35:
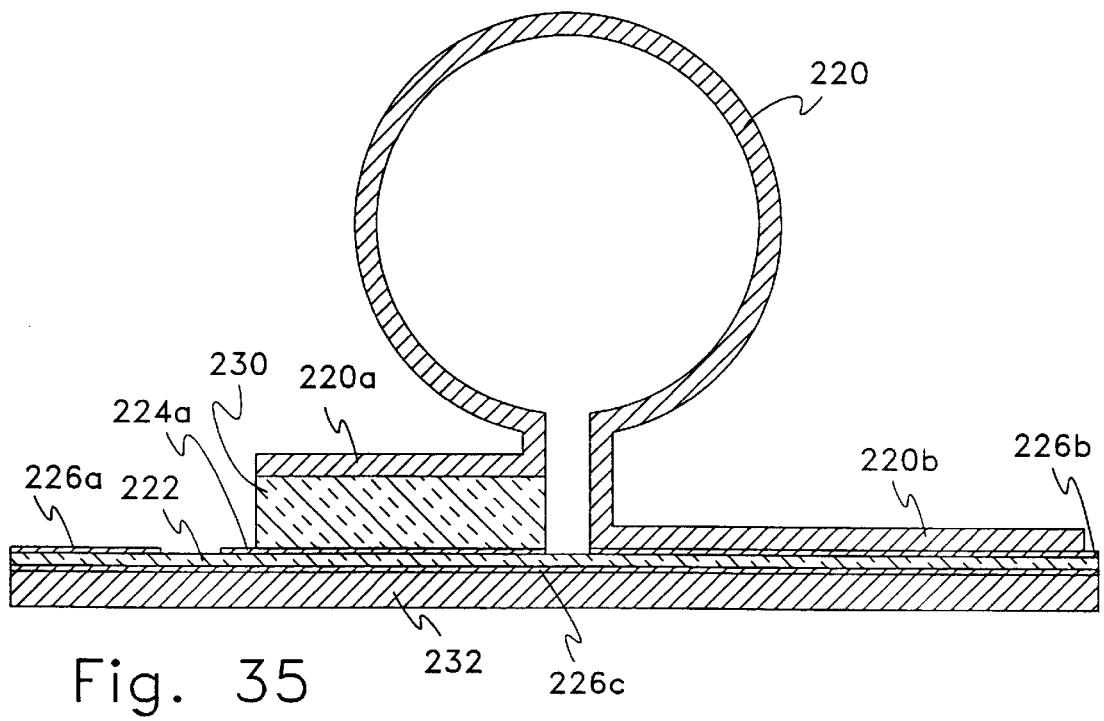
FIG. 35 is a cross sectional view taken along line 35—35 in FIG. 34.

FIGS. 34–35 show the omega coil 220 mounted on a printed circuit board 221. The printed circuit board 221 is a double-sided board with a dielectric layer 222 and conductive areas 224 and 226a–226c disposed thereon. The manufacture of such printed circuit boards is well known. Conductive area 226c covers one entire side of the printed circuit board 221 and is referred to as a ground plane. Conductive areas 226a and 226b are electrically connected to the ground plane 226c (e.g. by plated through holes or other types of electrical connection). Conductive area 224 forms a stripline impedance matching circuit with a portion 224a essentially corresponding to the blade structure as described in preceding examples.

As can best be seen in FIG. 35, a first capacitor is formed by lead 220a, dielectric 230, and the blade portion 224a. A second capacitor is formed between the blade portion 224a, the dielectric 222 of the printed circuit board 221, and the ground plane 226c. The printed circuit board 221 is mounted on a metal plate 232. The ground plane 226c is in electrical contact with the metal plate 232. The metal plate 232 adds strength to the assembly and provides a mounting location for a coaxial connector 228. The coaxial connector 228 has a center conductor which is connected (e.g. soldered) to the stripline 224. The outer case of the coaxial connector 228 is grounded to the metal plate 232.

Compared to the preceding examples, the omega coil 220 simplifies the manufacturing process. For example, the omega coil 220 is directly mounted on a printed circuit board in a manner similar to a surface mount component. Moreover, the omega coil 220 takes advantage of the dielectric layer 222 of the printed circuit board 221, thus requiring only a single additional dielectric 230 during assembly. The dielectric 230 can be assembled on the printed circuit board 221 using conventional automated assembly techniques.

Figure 36:
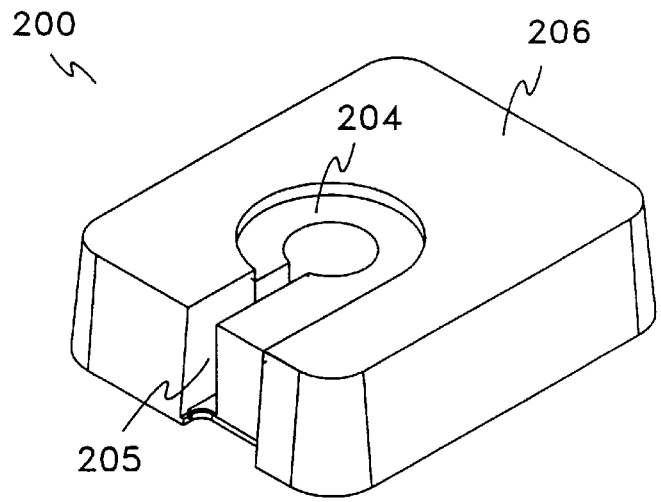
FIG. 36 is a perspective view of an integrated lamp head according to a fifth example of an electrodeless lamp utilizing an excitation coil according to the invention.
Figure 37:
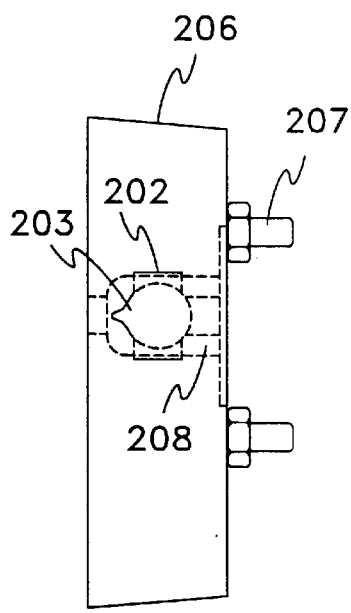
FIGS. 37–38 are side and top schematic views, respectively, of the fifth example.
Figure 38:
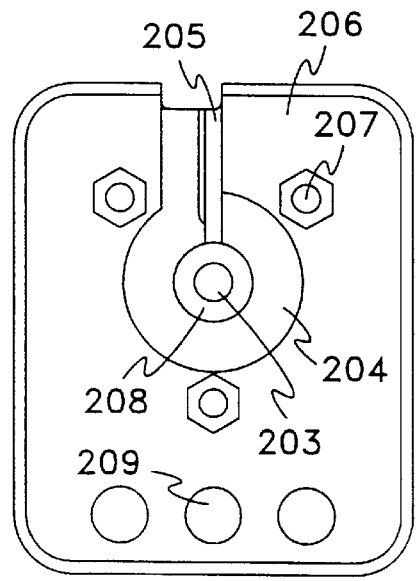

With reference to FIGS. 36–38, an example integrated lamp head 200 utilizes a wedding ring coil 202 according to the present invention. The integrated lamp head 200 is a monolithic structure which comprises a metal matrix composite holding an electrically insulating ceramic. A BN insert 204 is formed with a channel 204a corresponding to the outer diameter and axial height of the wedding ring shaped excitation coil 202. During the fabrication process, the aluminum fills the channel and the center of the BN insert 204. Subsequently, the center of the BN insert 204 is drilled out with a drill bit having a diameter corresponding to the inside diameter of the coil 202, thereby forming the wedding ring shaped coil 202. Similarly, a slot 205 is machined in the die cast structure to form the leads to the coil 202. The width of the machined slot provides the appropriate space for a blade and associated dielectrics to be subsequently inserted to form the series resonant circuit. Other details regarding the construction of the integrated lamp head 200 may be had by reference to the parent specification.

A bulb 203 is encased in a reflective jacket 208 which forms an aperture 208a. The bulb 203 is approximately centered axially and radially with respect to the coil 202. The bulb 203 and jacket 208 may be manufactured, for example, as described in the parent specification. In general terms, the reflective jacket 208 is formed by positioning the bulb 203 in the lamp head 200 and pouring a liquid solution of micro and nano particulate alumina and silica around the bulb 203. The solution hardens when it dries and the aperture is subsequently formed by removing some of the hardened reflective material. Alternatively, the bulb 203 may be separately encased with the reflective jacket 208 and subsequently inserted in the lamp head 200 as a unit (see FIG. 41).

Figure 39:
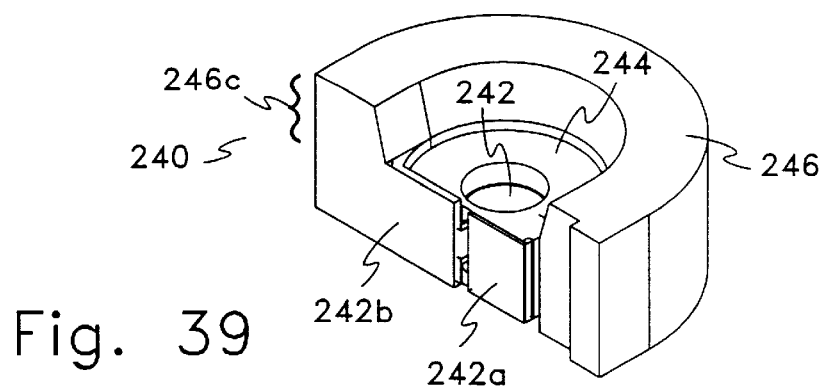
FIG. 39 is a perspective view of an integrated lamp head for a sixth example of an electrodeless lamp utilizing an excitation coil according to the invention.
Figure 40:
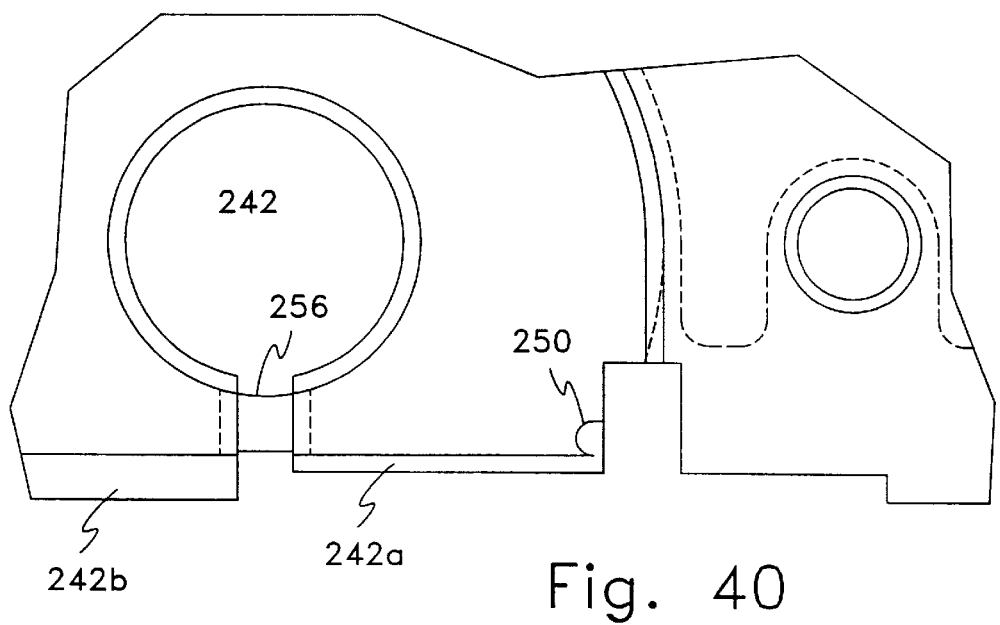
FIG. 40 is an enlarged, fragmented view of the sixth example.

FIG. 39 is a perspective view of an integrated lamp head for another example of an electrodeless lamp according to the invention. This example utilizes an omega coil 242 with leads 242a and 242b. FIG. 40 is an enlarged, fragmented view of this example. FIG. 40 illustrates a feature of the invention referred to as a locking pin 250. The BN insert 244 is formed with a recess which fills with aluminum and solidifies during the fabrication process. The aluminum solidified in the recess forms a locking pin 250 which helps prevent the lead 242a from separating from the BN insert 244.

Figure 41:
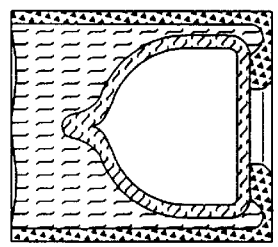
FIG. 41 is a cross sectional view of a preferred aperture cup utilized with the coils of the present invention.

FIG. 41 is a cross sectional view of a preferred aperture cup utilized with the coils of the present invention. The bulb is inserted in a reflective ceramic cup and positioned approximately symmetric with respect to the aperture. The cup is then filled with a reflective material which hardens to encase the bulb and secure the bulb in position. Other details of bulb and aperture forming processes are described above, in the parent specification, and in PCT publication WO 97/45858. Preferably, the reflective cup and the reflective material are low dielectric/high (relative) thermal conducting materials to aid in thermal management of the lamp.

Figure 42:
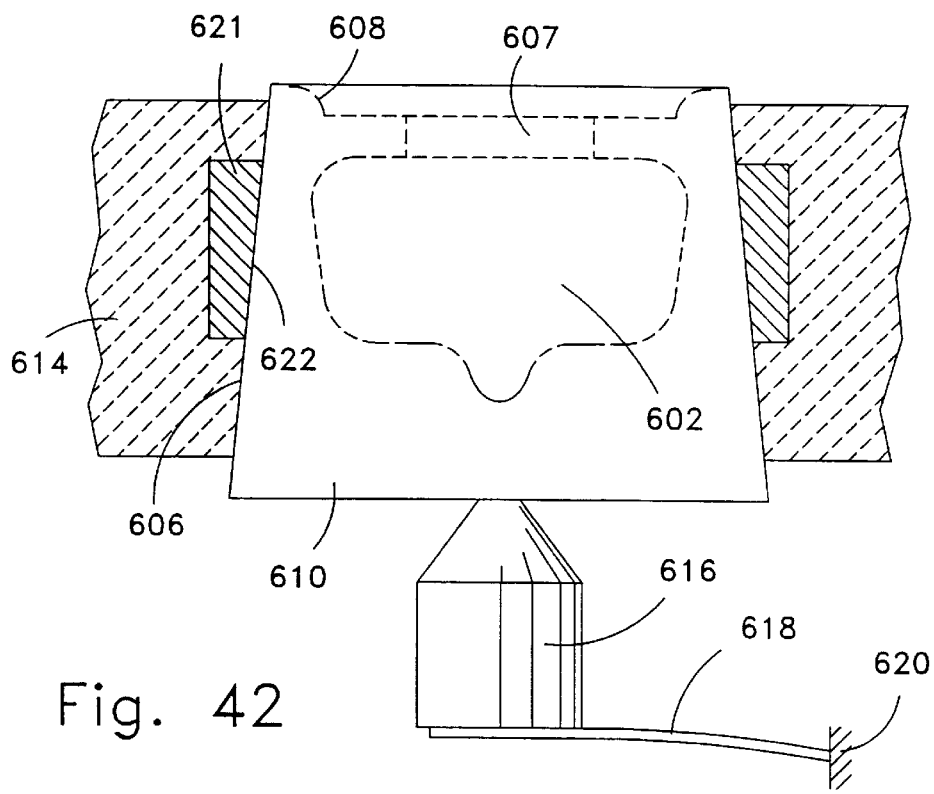
FIG. 42 is a schematic, cross sectional view of a seventh example of an electrodeless lamp utilizing an excitation coil according to the invention.

FIG. 42 shows a lamp which incorporates an aperture lamp bulb. An excitation coil 621, which may be in the form of a metallic band, is disposed around the container 610, while a heat sink 614, which may be made of a boron-nitride ceramic material surrounds the bulb and excitation coil. A plunger 616 which is biased by a spring 618, attached to a support 620, prevents movement of the lamp when it is turned off and physical contraction takes place due to cooling. It is noted that the inside surface 622 of the excitation coil 621 is tapered so as to mate with the taper of the outside surface 617 of the container wall.

The bulb and the lamp depicted in FIG. 42 possess many advantages, which will be described in greater detail below. For example, the inside surface 622 of excitation coil 621 is tapered so as to mate with the outside surface 617 of the container side wall. The inside surface of the annularly shaped heat sink 614 is similarly tapered. The mating tapered surfaces provide sure contact therebetween, resulting in high heat transfer. In the preferred example, the taper of both the inside and outside surfaces of the container side wall is between 0.5° and 2.0°. Other details regarding the construction and features of this example may be had with reference to the parent specification.

Figure 43:
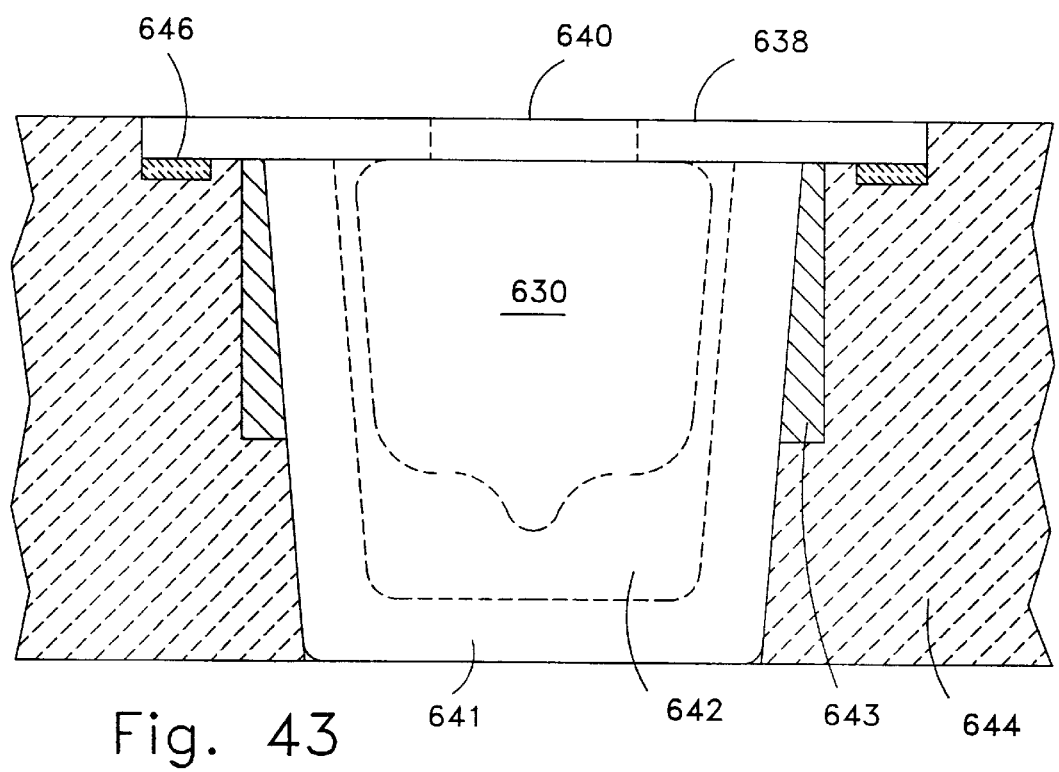
FIG. 43 is a schematic, cross sectional view of an eighth example of an electrodeless lamp utilizing an excitation coil according to the invention.

Referring to FIG. 43, a second example of an aperture lamp bulb in accordance with the invention is shown. In this example, the entire region in the container between the side wall and the lamp envelope is filled with a reflective fill material 642. The coil 643 is tapered in an opposite direction relative to the coil 621 in FIG. 42.

Referring to the aperture lamp of FIG. 43, it is noted that a ceramic washer 638 is wider than in the previous example, and is joined to the heat sink 644 with ceramobond 646. The flange provided by the oversized washer 638 facilitates heat transfer away from the bulb. The other components depicted in FIG. 43 are similar to the corresponding components of FIG. 41. Other details regarding the construction and features of this example may be had with reference to the parent specification.

While the invention has been described with respect to specific examples, the invention is not so limited. Based on the drawings, the detailed description, and the teachings set forth herein, numerous other examples will occur to those skilled in the art. The preceding examples should be considered as illustrative only, with the scope and spirit of the invention being set forth in the following claims.

What is claimed is:

1. An excitation coil for an inductively coupled electrodeless lamp, the excitation coil comprising a substantially non-helical, semi-cylindrical conductive surface having less than one turn, the inductively coupled lamp further including an envelope enclosing a fill and a source of excitation energy connected to the coil.

2. The excitation coil as recited in claim 1, wherein the conductive surface comprises a wedding ring shape.

3. The excitation coil as recited in claim 1, wherein the conductive surface has a relatively thin radial thickness and an axial height at least greater than the radial thickness.

4. The excitation coil as recited in claim 3, wherein the axial height is between about one-third and about two-thirds of a diameter of the conductive surface.

5. An excitation coil for an inductively coupled electrodeless lamp, the excitation coil comprising a conductive surface having a wedding ring shaped excitation portion and first and second leads bent tangential to the excitation portion and parallel to each other, the conductive surface having a cross-sectional shape generally corresponding to the upper-case Greek letter omega, the inductively coupled lamp further including an envelope enclosing a fill and a source of excitation energy connected to the coil.

6. An excitation coil for an inductively coupled electrodeless lamp, the excitation coil comprising one or more conductive surfaces configured to provide at least two current loops, wherein the at least two current loops are spaced apart from and substantially parallel to and in phase with each other, the inductively coupled lamp further including an envelope enclosing a fill and a source of excitation energy connected to the coil.

7. The excitation coil as recited in claim 6, wherein the one or more conductive surfaces are configured to provide two semi-circular current loops, the two semi-circular current loops being substantially parallel to and in phase with each other and having a substantially same axis and diameter, wherein the two current loops are spaced apart by a height which is about 40 to 60 percent of the diameter of the two semi-circular current loops.

8. The excitation coil as recited in claim 6, wherein the one or more conductive surfaces comprise a single non-helical, semi-cylindrical surface having less than one turn.

9. The excitation coil as recited in claim 6, wherein the one or more conductive surfaces comprise two non-helical, semi-cylindrical surfaces, each having less than one turn.

10. The excitation coil as recited in claim 9, wherein the two non-helical, semi-cylindrical surfaces are connected in parallel.

11. An excitation structure for an inductively coupled electrodeless lamp, the excitation structure comprising two excitation coils connected in parallel, spaced apart from and substantially parallel to each other, the inductively coupled lamp further including an envelope enclosing a fill and a source of excitation energy connected to the coil.

* * * * *